Dec. 30, 1924.

J. TURMES

NUTCRACKER

Filed March 13, 1924

1,521,345

Inventor

John Turmes

By Lacey & Lacey, Attorneys

Patented Dec. 30, 1924.

1,521,345

UNITED STATES PATENT OFFICE.

JOHN TURMES, OF BRECKENRIDGE, TEXAS, ASSIGNOR OF ONE-HALF TO NORMAN T. HARPER, OF BRECKENRIDGE, TEXAS.

NUTCRACKER.

Application filed March 13, 1924. Serial No. 698,993.

*To all whom it may concern:*

Be it known that I, JOHN TURMES, a citizen of Luxemburg, residing at Breckenridge, in the county of Stephens and State of Texas, have invented certain new and useful Improvements in Nutcrackers, of which the following is a specification.

This invention relates to nut crackers and seeks primarily to provide a nut cracker which may be readily operated to crack the shells of nuts and which will be composed of few parts so that it is not apt to get out of order. The invention also has for an object the provision of a nut cracker which may be quickly adjusted to the size of the nuts to be cracked and which will be so constructed that the cracked nuts will be directed onto a plate or other receptacle placed below the cracking members. Other objects of the invention will appear in the course of the following description, and the invention resides in certain novel features which will be particularly pointed out in the appended claim.

The invention is illustrated in the accompanying drawing, in which—

Figure 1:
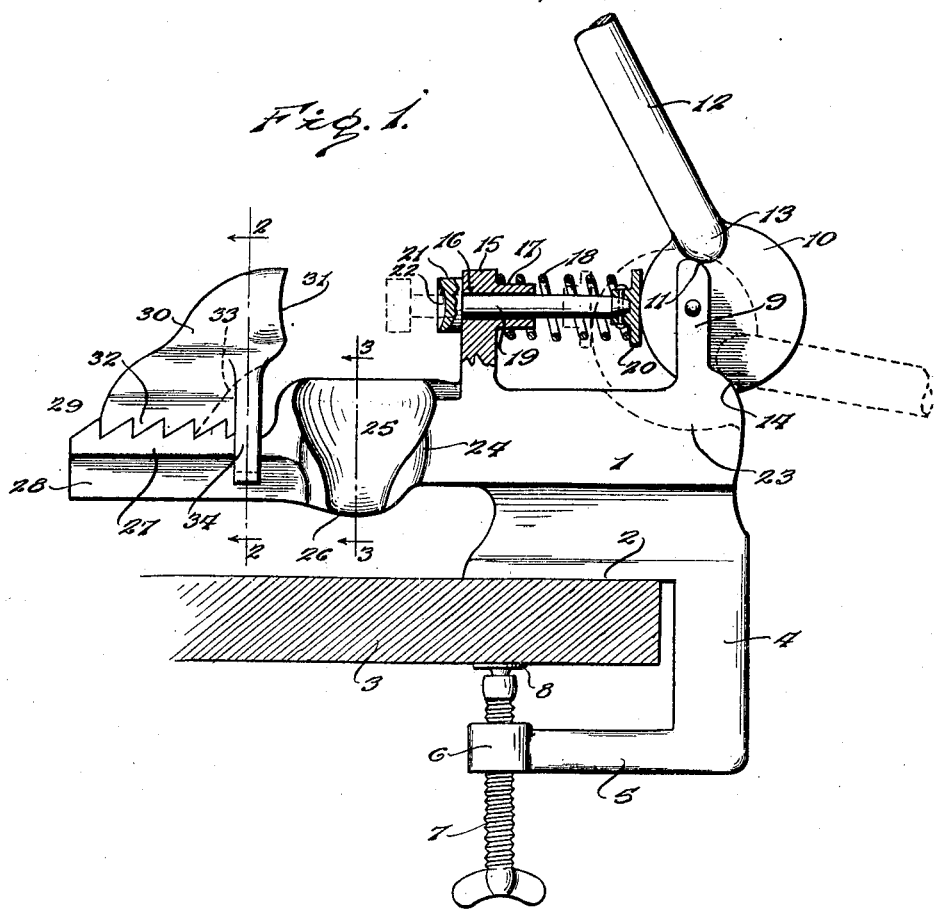
Figure 1 is a side elevation, partly in section, of a nut cracker embodying my improvements.

The main body of my improved nut cracker may be a single casting having a body portion 1 provided on its under side with a jaw 2 adapted to rest upon a table or other fixed support, indicated at 3, at the edge of said support, and from the said fixed jaw at the outer end thereof depends a hanger or connecting member 4, from the lower end of which a jaw 5 extends inwardly under the table. The end of the jaw member 5 is provided with an internally threaded eye 6 through which is engaged a clamping screw 7 having a swiveled head 8 at its upper end which is adapted to bear against the under side of the table so that, when the screw is turned home, the main body of the device will be securely clamped thereon, as will be understood upon reference to Fig. 1.

The body 1 extends inwardly beyond the fixed jaw in spaced relation to the table, and upon its upper side at its outer end is a post 9 upon which is pivoted an eccentric 10. The upper extremity of the post 9 is beveled at its outer side, as indicated at 11, and a lever or handle member 12 extends radially from the eccentric to facilitate the manipulation of the same. The lever or handle member will preferably be formed integral with the eccentric and is of a greater thickness than the eccentric so that its terminal portion will project from the face of the eccentric, as shown at 13, in position to abut the upper extremity of the post 9 in one position, as shown in full lines in Fig. 1, and abut the side of the post or the protruding portion 14 of the body at the base of the post in another position, as shown by the dotted lines in Fig. 1. Spaced inwardly from the post 9, a post 15 rises from the main body 1 of the device, and this post has an opening 16 therethrough near its upper end, a boss 17 being provided on the outer side of the post in axial alinement with the said opening to receive and support one end of a coiled spring 18. A plunger rod 19 is slidably mounted in the opening 16 and the boss 17 and extends axially through the spring 18 to a point adjacent the eccentric 10 where it is equipped with an enlarged head 20 bearing against the edge of the eccentric and held to the eccentric by the outer end of the spring. The inner end of the plunger rod 19 carries a plunger head 21 which has its inner or free end cupped or recessed, as indicated at 22, so that it will form a positive seat for the nuts to be cracked. It will be readily understood that, if the lever or handle 12 be swung from the position shown in full lines in Fig. 1 to the position shown by dotted lines, the eccentric will be caused to turn about its pivot and will force the plunger rod 19 inwardly against the tension of the spring 18 and, in order to accommodate the movement of the eccentric, the upper side of the body 1 is recessed, as indicated at 23.

The body of the device extends inwardly beyond the post 15 to constitute a nut supporting portion 24, and one side of this nut supporting portion is constructed to present a downwardly and laterally inclined groove or recess 25 which tapers toward its lower end 26 so that, after a nut has been cracked and the holding pressure thereon is released, the cracked shell and the meat will gravitate through the recessed portion 25 onto a plate or other receptacle below the same.

Figure 2:
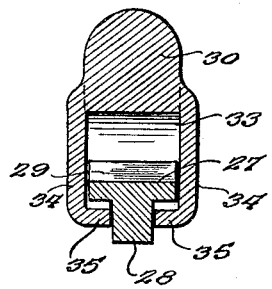
Fig. 2 is a vertical transverse section on the line 2—2 of Fig. 1.
Figure 3:
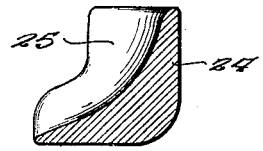
Fig. 3 is a detail transverse section on the line 3—3 of Fig. 1.

Extending inwardly over the table beyond the nut supporting portion 24 is a prolongation or stem 27 of the body which is provided on its under side with a longitudinal rib 28 whereby this prolongation is given a T-shaped cross section, as shown clearly in Fig. 2, and upon the upper side of the head of the T are a series of teeth 29 having their vertical faces presented toward the plunger whereby they form stops for the anvil or thrust-receiving jaw. The anvil or thrust receiving jaw comprises a body 30 having a concave face 31 disposed in axial alinement with the plunger and presented to the head 21 of the plunger. On the lower end or side of the body 30 are a series of teeth 32 which correspond with the teeth 29 but are arranged reversely thereto, as shown clearly in Fig. 1, whereby, when the body 30 has been placed in position, the thrust thereon during the operation of cracking a nut will be effectually resisted and the said member will serve as an anvil to receive the power exerted through the eccentric and the plunger. The under side of the anvil is cut away, as indicated at 33, so that it may be readily tilted to clear the teeth when being adjusted and also that it may, if necessary, fit over the side of the nut supporting portion 24 of the body. At the outer or working end of the anvil, upon the sides of the same, are formed the depending retainers 34 having their lower extremities turned toward each other, as indicated at 35, to engage under the head of the prolongation 27 and lie at the sides of the rib 28. The lifting of the anvil during the cracking operation is thus prevented while at the same time there is sufficient clearance to permit the anvil to be rocked so that the teeth may be disengaged and the anvil shifted to another position when a larger or smaller nut is to be accommodated, it being understood that, before the device is used, the anvil member is to be adjusted to the average size of the nuts which are to be cracked.

The device having been properly secured in place upon a fixed support and the anvil member having been properly adjusted, the nuts are held singly by the fingers between the anvil and the plunger head, after which the eccentric is rotated so as to force the plunger inwardly against the tension of the spring 18, as has been above described, so that sufficient pressure will be exerted upon the shell of the nut to crack the same quickly and thoroughly. If the nut be released after being cracked, the several pieces will at once slide down the chute or recess 25 in the side of the nut supporting member onto a plate or other receptacle. It will be readily understood that the nut may rest upon the upper edge of the portion 24 and, after it has been initially engaged by the plunger head 21, the user of the device may withdraw his fingers from the nut as the pressure exerted through the plunger will then hold the nut in place. Immediately upon the shell cracking, it will gravitate through the chute 25 and the plunger may be permitted to withdraw so that another nut may be cracked. It will thus be seen that, while the device is very simple in its construction and may be produced at a very low cost, it is efficient in operation and a large number of nuts may be very quickly and completely opened without any liability of the user's fingers being pinched. The engagement of the lever or handle member 12 with the surfaces 11 and 14 positively limits the movement of the lever so that jamming of any of the parts or the placing of excessive strain upon the spring will be avoided and the handle will always come to rest in a position where it may be conveniently grasped by the user.

Having thus described the invention, I claim:

A nut cracker comprising a body member adapted to be secured to a fixed support, a post rising from said body member at the outer end thereof, an eccentric pivoted upon said post, a handle member extending from the edge of the said eccentric and having its terminal portion offset laterally from the face of the eccentric to form a stop adapted to engage the upper end of the post or the end of the body at the base of the post, a second post rising from the body and spaced inwardly from the first-mentioned post, a plunger slidably mounted in the upper end of the second-mentioned post, a head on the inner end of said plunger at one side of the second-mentioned post, a head at the outer end of said plunger bearing slidably against the edge of the eccentric, a coiled spring encircling the plunger and bearing at its ends respectively against the second-mentioned post and the head at the outer end of the plunger, and an anvil mounted upon the body in spaced relation to and alined with the plunger.

In testimony whereof I affix my signature.

JOHN TURMES.